United States Patent [19]
Veneruso

[11] Patent Number: 5,521,592
[45] Date of Patent: May 28, 1996

[54] METHOD AND APPARATUS FOR TRANSMITTING INFORMATION RELATING TO THE OPERATION OF A DOWNHOLE ELECTRICAL DEVICE

[75] Inventor: Anthony F. Veneruso, Ville d'Avray, France

[73] Assignee: Schlumberger Technology Corporation, Houston, Tex.

[21] Appl. No.: 278,788

[22] Filed: Jul. 20, 1994

[30] Foreign Application Priority Data

Jul. 27, 1993 [FR] France .................... 93 09223

[51] Int. Cl.⁶ .................................................. G01V 3/00
[52] U.S. Cl. ............................ 340/854.8; 340/854.9; 340/855.1; 340/855.2; 340/855.8
[58] Field of Search .................... 340/854.8, 854.9, 340/855.1, 855.2, 855.8

[56] References Cited

U.S. PATENT DOCUMENTS

| | | | |
|---|---|---|---|
| 3,340,500 | 9/1967 | Boyd et al. | 340/855.8 |
| 4,157,535 | 6/1979 | Balkanli | 340/855.8 |
| 4,523,194 | 6/1985 | Hyde | 340/855.8 |
| 4,631,535 | 12/1986 | Butlin | 340/855.8 |
| 4,646,083 | 2/1987 | Woods | 340/854.8 |
| 4,788,545 | 11/1988 | Farque | 340/855.8 |
| 4,901,069 | 2/1990 | Veneruso | 340/854.8 |
| 4,901,070 | 2/1990 | Vandevier | 340/855.8 |
| 5,008,664 | 4/1991 | More et al. | 340/854.8 |

Primary Examiner—J. Woodrow Eldred
Attorney, Agent, or Firm—J. H. Bouchard

[57] ABSTRACT

A method and apparatus for transmitting information relating to the operation of an electrical device disposed in a borehole, in which information picked up by at least one downhole sensor is conveyed to surface reception means via the wire connection connecting said device to electrical power supply means on the surface, the invention being characterized in that said wire connection is inductively coupled firstly with said sensor and secondly with said reception means.

9 Claims, 4 Drawing Sheets

METHOD AND APPARATUS FOR TRANSMITTING INFORMATION RELATING TO THE OPERATION OF A DOWNHOLE ELECTRICAL DEVICE

BACKGROUND OF THE INVENTION

1. Field of the Invention

The present invention relates to a method and to apparatus for transmitting information relating to the operation of an electrical device disposed in a borehole, e.g. such as a submersible pump for pumping the hydrocarbons coming from the underground formations through which said borehole passes. The information relating to the operation of the pump includes, for example, outlet and inlet pressures, flow rate, fluid density, motor temperature, vibration, or any other information that is suitable for controlling and monitoring the operation of the pump.

2. Description of Prior Art

Because formation pressure decreases after a certain period of production, it is necessary to make use of artificial means to bring hydrocarbons from the bottom of a well to the surface, and this is done by means of pumps driven by high power electric motors (e.g. of the order of 300 horse power). Such pumps require electrical power at high voltage and at high current, thereby giving rise to high cost in power consumption, and also requiring equipment for conveying electrical power from the surface to the motor that drives the pump.

Since, by definition, such pumps are not directly accessible, they must be monitored remotely from the surface.

Known monitoring techniques have been developed (see U.S. Pat. Nos. 3,340,500 and 4,901,070 for example) that make use of the electrical power wire or cable connection connecting the electric motor of the pump to power supply means on the surface. In general, the power supply is of the three-phase type and comprises three electrical cables or wires, each for one of the phases, the three wires being connected to ground at the electric motor driving the pump by means of a "star" or "Y" junction. At the surface, the three wires are connected to electrical power supply transformers. Parameters relating to the operation of the pump, or of the electric motor, are picked up by at least one sensor disposed in proximity to the pump or the motor and is connected to at least one of the phase wires for powering the motor via a resistive connection, i.e. a direct wire-to-wire junction at the pump/motor assembly. A second resistive connection at the surface serves to connect said phase wire to a measurement device suitable for receiving and/or processing information directly. It is usual to provide a filter (of the RC type) between the reception means on the surface and the resistive connection.

Information is then transmitted by injecting DC from the reception device on the surface to the sensor which in turn sends information back to the reception means on the surface by using the corresponding phase wire to convey the information.

That known method and apparatus give rise to major drawbacks.

Firstly, the resistive and direct junction constitutes a hazard for the user when connecting the reception device for processing the information. The phase wire conveys high tension electricity (at about 2400 volts). In order to reduce considerably the risk of electrocution, circuits are provided that constitute a safety barrier, thereby not only increasing cost, but also failing to eliminate the hazard completely. Further, the use of apparatus of this type is being impeded by the psychological reticence of users coming to connect a device to a line that is carrying high tension. Furthermore, in the event of the filter or the safety circuits failing, several thousand volts from the phase wire are injected into the information-receiving device (such as a personal computer), with the resulting hazard for the operator, not to mention the damage to said computer.

Furthermore, it is usual to perform tests to verify that the power supply wires or cables are themselves well isolated, electrically. To do this, a high DC voltage (of the order of 500 volts or more) is injected from the surface. Nevertheless, that isolation test is of poor reliability given the leaks that occur via pressure gauges constituted by resistances.

Attempts have been made to remedy that drawback (see for example U.S. Pat. No. 4,157,535 or 4,523,194) by providing means for disconnecting the circuit including the downhole pressure gauge so as to enable the isolation test to be performed. Such circuits are relatively complicated, thereby increasing cost, and their components disturb the operation of the pressure gauge circuit.

Proposals have also been made to transmit information relating to the operation of the pump via a direct connection, using an electric cable that is separate from the pump power supply cables. The distinct cable for information transmission is connected directly to the sensor and receives DC or AC.

That known means suffers from drawbacks.

Firstly it is very expensive given its structure.

Equally, the presence of a distinct cable makes it necessary to provide through-holes for said cable at each sealing member, thereby increasing the risk of leaks.

Finally, it is very difficult if not impossible to install the above-mentioned known apparatus on existing equipment that is already in place without major modification, and that increases installation cost.

SUMMARY OF THE INVENTION

The present invention seeks to remedy those drawbacks and provides a method and apparatus suitable for transmitting information such as the operating parameters of an electrical device, e.g. a motor driving a pump disposed in a hydrocarbon-producing zone of a well, without requiring modification to existing systems and tooling, in complete safety and without hazard for users, at lower cost, and finally without the transmission of said information interfering with the electrical power supply of said motor.

There is provided, according to the invention, a method of transmitting information relating to the operation of an electrical device disposed in a borehole, in which information picked up by at least one downhole sensor is conveyed to surface reception means via a wire connection connecting said device to electrical power supply means on the surface, said wire connection being inductively coupled firstly with said sensor and secondly with said reception means.

Advantageously, a filter is disposed between the inductive coupling and the sensor, and a filter is also disposed between the inductive coupling and the reception means.

In an advantageous embodiment, said device is electrically powered via a three-phase wire connection, and inductive coupling is associated with each of the wires in such a manner that the total magnetic flux is zero when the assembly is in a state of electrical equilibrium.

The invention also provides an apparatus for transmitting information relating to the operation of a device disposed in a borehole, the information coming from at least one sensor in the borehole that is suitable for picking up said information, the apparatus comprising means for transmitting information from said sensor to reception means on the surface via the wire connection connecting said device to electrical power supply means on the surface, and further including inductive coupling means between said wire connection and said sensor, and inductive coupling means between said wire connection and said reception means.

BRIEF DESCRIPTION OF THE DRAWINGS

The invention will be well understood in the light of the following description which relates to an illustrative and non-limiting example of the invention and which refers to the accompanying drawings, in which.

DESCRIPTION OF THE INVENTION

Figure 1:
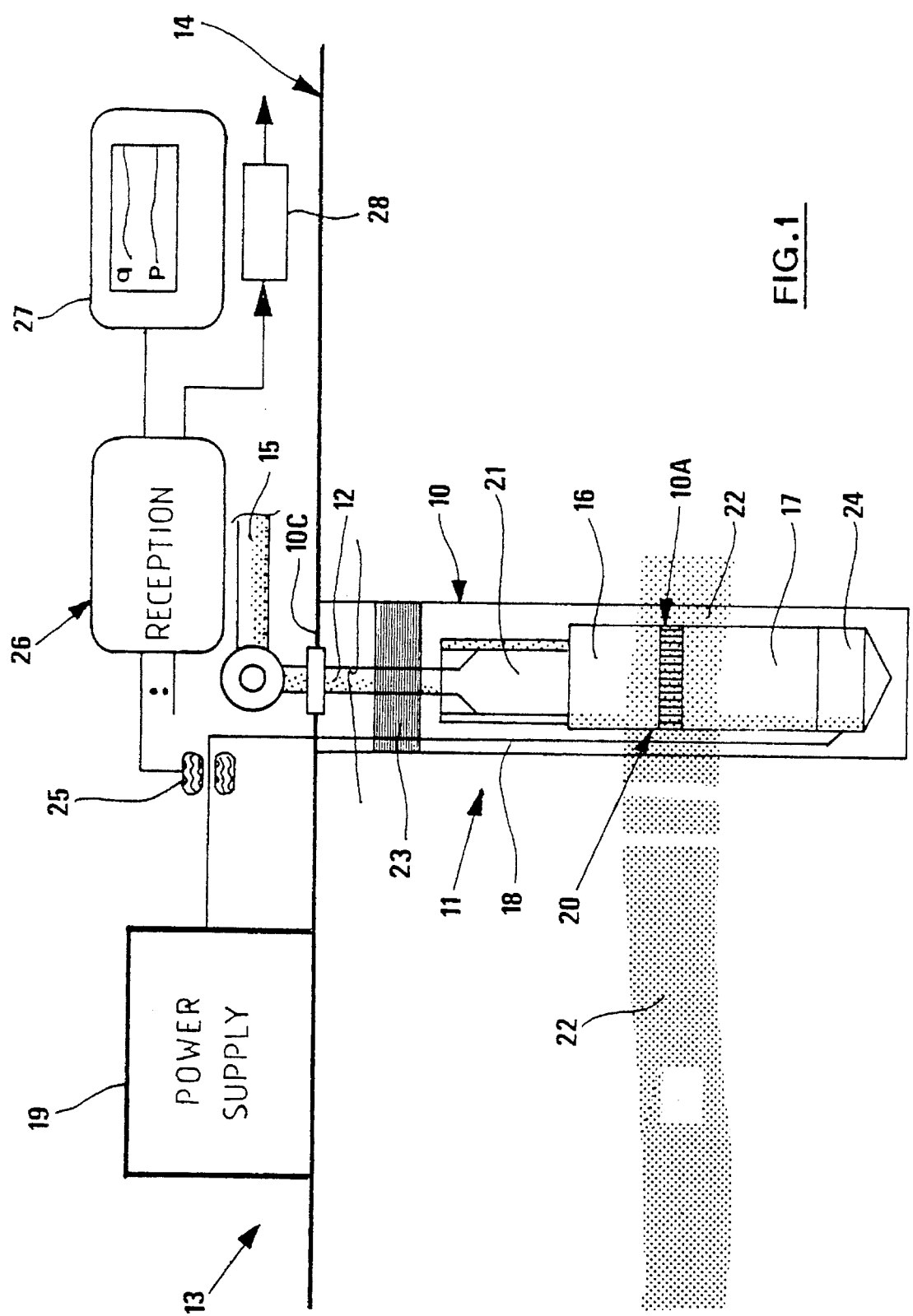
FIG. 1 is an overall diagram of the apparatus of the invention.

FIG. 1 shows the apparatus for implementing the method of the invention in its application to the field of exploiting hydrocarbon wells. In order to facilitate comprehension, FIG. 1 is highly diagrammatic and the various elements are not to scale.

In a well 10 passing through geological formations 11, production tubing 12 is provided in the form of a duct conveying hydrocarbons coming out of the formations 11 from the productive zone 10A of the well to the surface 13. The well head 10C on the surface of the ground 14 is provided with the usual control means that are known per se. The production tubing 12 opens out at the surface and the hydrocarbons are conveyed via a duct 15 on the surface to means for processing and/or storing them (not shown and known per se).

A pump 16 disposed in the productive zone 10A is driven by an electric motor 17 itself electrically powered via a wire connection 18 in the form of an electric cable, e.g. a three-phase cable. The power cable 18 is connected to surface power supply means 19, e.g. such as an AC power supply providing 2400 volts at 60 Hz and capable of delivering 30 amps to 35 amps. A sonde 20 is associated with the assembly comprising the pump 16 and the motor 17 and it includes one or more sensors 21 suitable for measuring parameters relating to the operation of the pump and to the flow of hydrocarbons 22 coming from the formations 11. For example, the sensors may measure the inlet and outlet pressures of the pump, its flow rate, the density of the fluid, the temperature of the motor, vibration parameters, or any other useful parameter.

The productive zone 10A in which the sonde 20 is located is isolated from the remainder of the well by a seal member 23, known in the art as a "packer", and placed around the production tubing 12.

The parameters measured by the set of sensors 21 are conveyed in the form of electrical signals to the surface 13 via the power supply wire connection 18. Downhole coupling means 24 are provided for connecting the sensors 21 disposed in the sonde 20 to the power supply cable 18. Surface coupling means 25 disposed on the surface connect the surface portion of the power supply cable 18 to reception means 26 intended for processing and recording information, and in turn delivering information to display means 27 and/or remote transmission means such as a modem 28, in order to transmit the information to a distant processing center.

Figure 2:
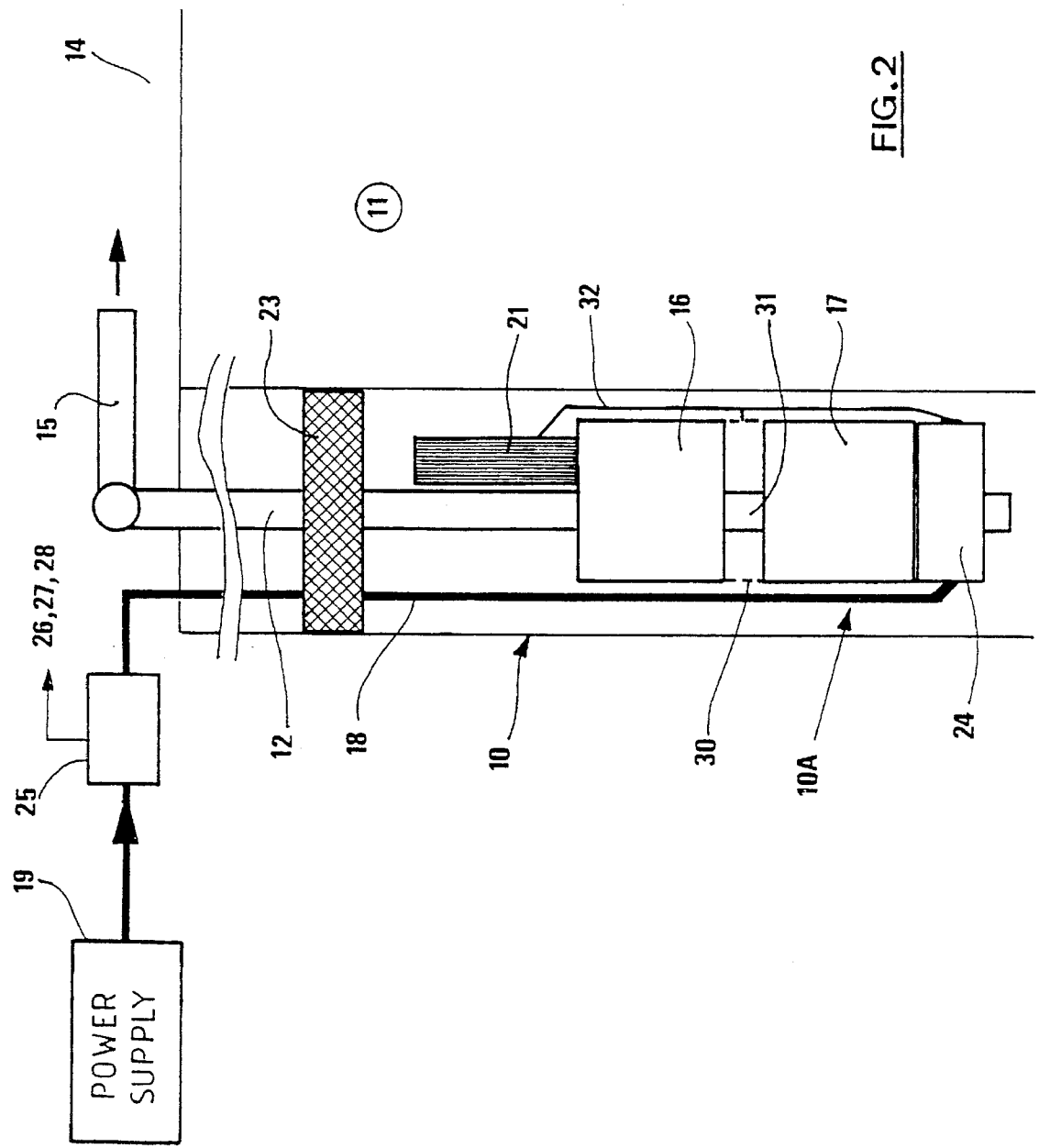
FIG. 2 is a diagram showing a portion of FIG. 1 in detail.

FIG. 2 is a diagrammatic detail view of the downhole apparatus, the pump 16 pumping the hydrocarbons in the productive zone 10A via a suction opening 30. The pump is driven by the motor 17 which is connected to the pump via a coupling 31. The motor is powered from the surface power supply means 19 via the three-phase cable 18. The sensors 21 are connected to the cable 18 by a connection 32 and the first coupling means 24.

Figure 3:
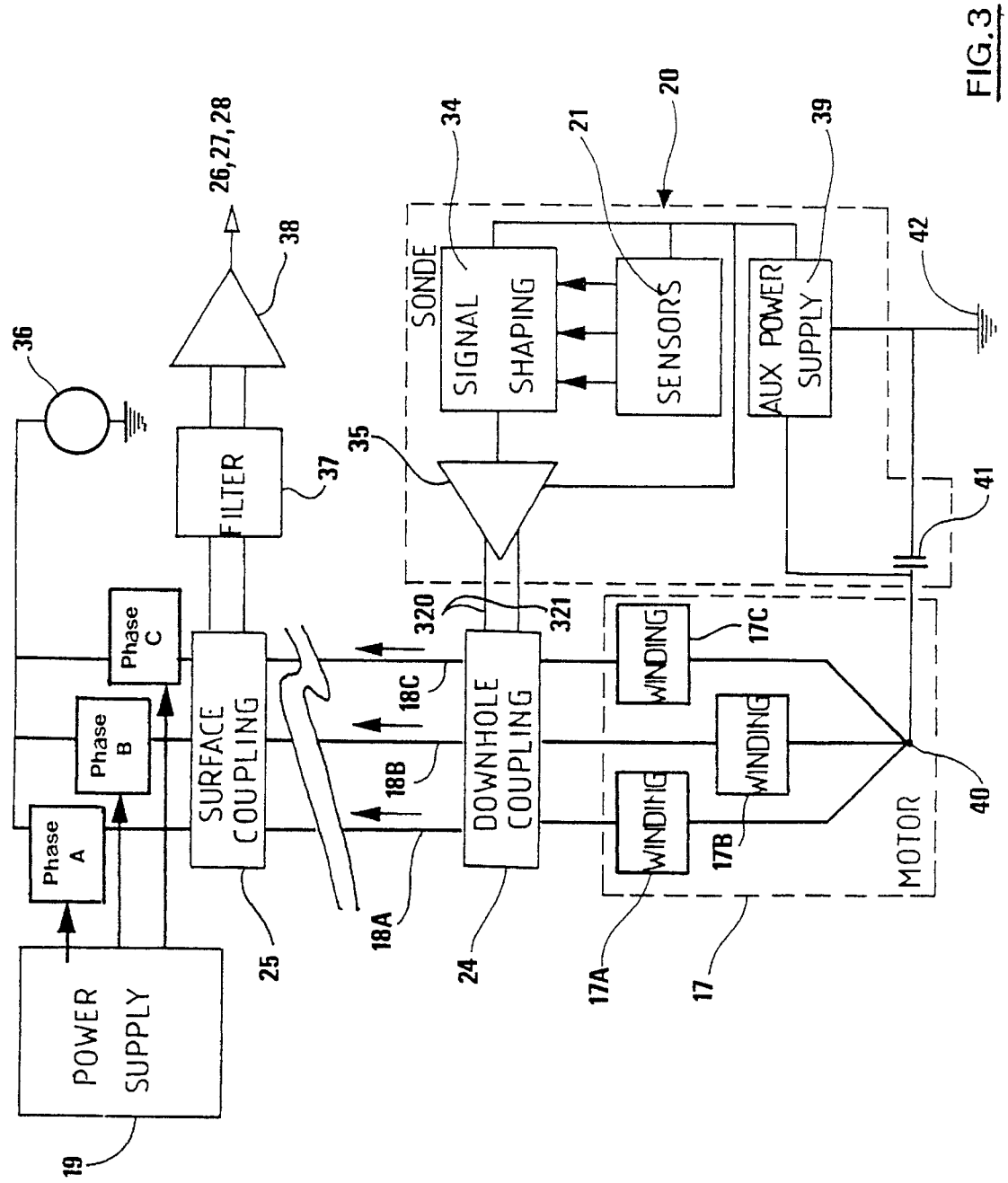
FIG. 3 is a block diagram showing the overall electrical circuit of the apparatus of the invention.

FIG. 3 is a detail view of the electrical circuit of the apparatus of the invention in which elements that are similar or identical to elements in the other figures are given the same references. The sonde 20 includes sensors 21 delivering analog signals representative of the operating parameters of the pump and means 34 for shaping the signals which means have an output connected to an amplifier 35. The amplifier is connected via a connection 32 (comprising two branches 320 and 321) to the downhole coupling means 24 suitable for connecting the sensors 21 to each of the phase wires 18A, 18B, and 18C. The surface coupling means 25 are also associated with each of the phase wires where they come from the surface power supply means 19, and where they are connected to the neutral point via an auxiliary source 36. The surface coupling means 25 connect the phase wires 18A, 18B, and 18C to means on the surface for processing, display, and transmission purposes (given references 26, 27, and 28 in FIG. 1) via a filter 37 and an isolating amplifier 38. A capacitor 41 isolates the neutral junction 40 of the motor 17 from ground or earth 42.

A power supply regulator 39 connected to the shaping means 34 is provided inside the sonde 20, and it is also connected firstly to earth or ground and secondly to the neutral point 40 ("Y" junction). The "Y" junction constitutes the common point of the phase wires 18A, 18B, and 18C for powering the motor 17. The motor has three windings given respective references 17A, 17B, and 17C, each being disposed on a respective one of the phase wires 18A, 18B, and 18C. The circuit elements disposed inside the sonde 20, the windings of the motor 17, the filter 37, the isolation amplifier 38, and also the main power supply 19 and the auxiliary power supply 36 are all known per se and are not described in greater detail.

Figure 4:
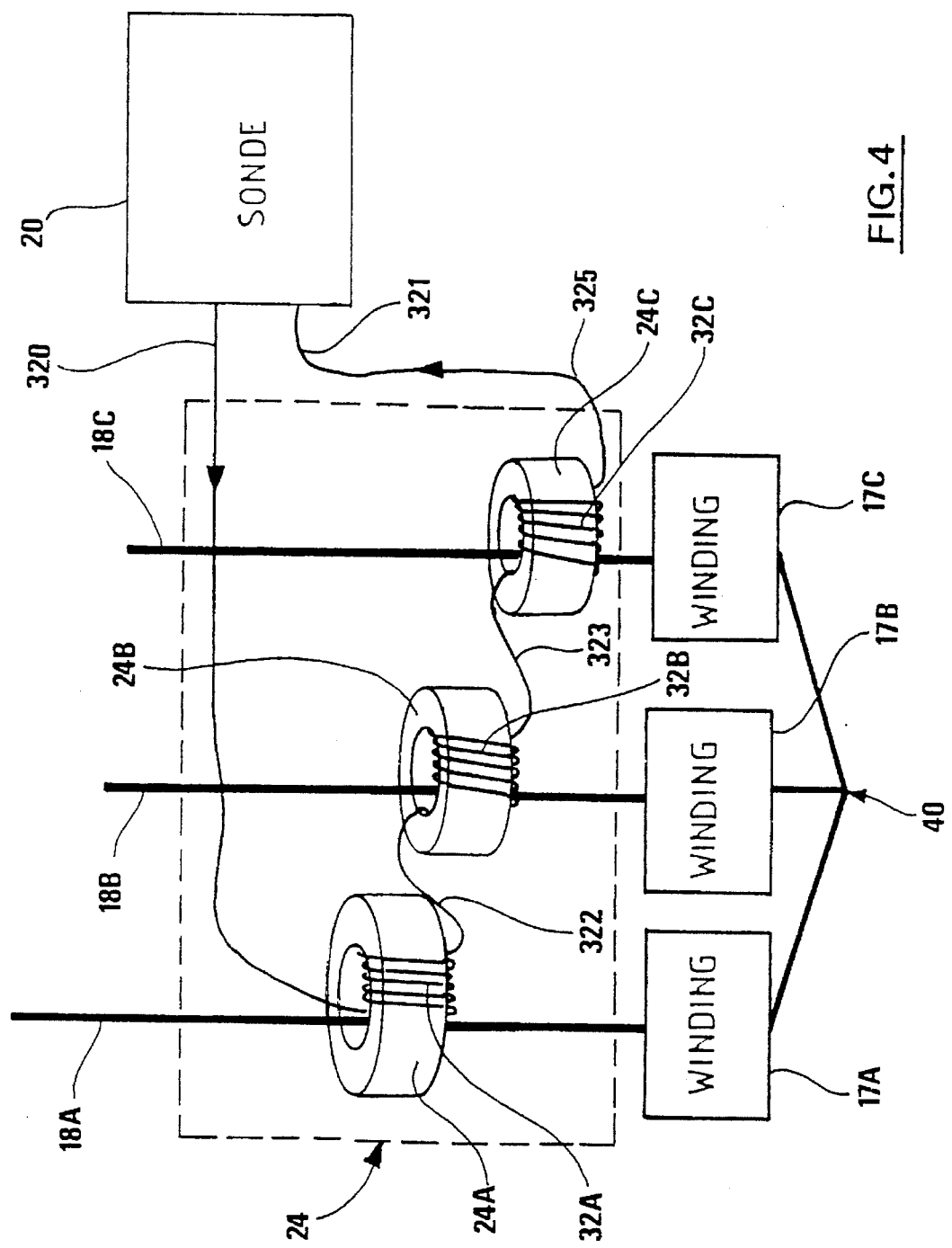
FIG. 4 is a diagrammatic detail view showing the principle of inductive coupling.

With reference to FIG. 4, the downhole coupling means 24 comprise elements in the form of cylindrical rings and made of magnetically permeable material, e.g. ferrite or an iron alloy. The rings are referenced 24A, 24B, and 24C. They are disposed in such a manner as to have the phase wires 18A, 18B, and 18C passing through them respectively. The connection 32 between the sonde 20 and the downhole coupling means 24 comprises a single wire having a feed first end 320 and a return second end 321. The ends 320 and 321 are connected to the sonde 20. The single wire 32 is disposed relative to the cylindrical coupling rings 24A, 24B, and 24C in such a manner that going from the feed end 320, the wire passes several times through the first ring 24A so as to form a winding 32A. The branch 322 (of the wire 32) leaving the open central portion of the ring 24A, passes through the second ring 24B so as to form a second winding 32B. Similarly, the branch 323 coming out from the second ring 24B passes through the third ring 24C so as to form a third winding 32C. The branch 325 coming from the third ring 24C is connected to the return end 321 going back to the sonde 20.

The single wire 32 constituting the secondary windings of the inductive couplers is disposed relative to each of the annular coupling elements 24A, 24B, and 24C in such a manner as to inductively couple the sum of the magnetic flux produced by all three-phase wires 18A, 18B, and 18C. In other words, when the three-phase system is in equilibrium in the electrical sense of the term, then the total flux is zero because of the 120° phase shift from one phase to another. Thus, the lines 18A, 18B, and 18C induce no current through the terminals of the winding 32 of the sonde.

The surface coupling means 25 are similar.

The apparatus operates as follows.

The inductive coupling achieved between the sonde 20 (more particularly the sensors 21) and the phase wires 18A, 18B, and 18C of the electrical power supply enable the signals from the sensors 21 to be transmitted via the power supply cable 18 in complete safety. The high tension of the cable is not applied to the surface devices (references 26 to 28 in FIG. 1). Also from the safety point of view, the capacitor 41 in the sonde serves to ensure that the circuit carrying the sonde current is looped via ground 42. The sonde may be powered from the "Y" common point 40 (as shown in FIG. 3), or in a variant by means of a separate AC power supply that makes use of the downhole inductive coupling 24.

Information in digital form may be transmitted from the sonde to the surface by modulation techniques that are known per se.

The frequencies of the signals may be selected so as to filter out all noise on the power supply line 18. By way of example, transmission at a rate of 300 bits/second may be implemented by using FSK type modulation at 2025 Hz and at 2225 Hz, or at any other CCITT standard frequencies (V21 or V23).

The currents of the signals conveying information from the sensors 21 are in-phase, and consequently a common mode output voltage is induced in the surface coupling 25. The surface filter 37 is designed to eliminate any frequency noise on the power supply line 18. The isolating amplifier 38 serves to eliminate any voltage peak or surge that could appear at the output due to transient signals whenever the power circuit is switched on or off, or to any possible major unbalance between the phases.

The isolating amplifier 38 increases the voltage level of the signals and also makes it compatible with the ground used by the surface processing circuits (26, 27, and 28). The cylindrical rings of the inductive couplers 24 and 25 may be constituted by any type of ferrite, e.g. nickel zinc or zinc magnesium ferrite of type MN 80, providing it has a high Curie temperature (230° C.), good magnetic properties, and is compatible with the fluids present in the well, e.g. brine, hydrocarbons, and gas.

In order to reduce costs and to facilitate assembly, the downhole inductive coupling may be located inside a functional block that is isolated from the pressure that obtains in the well and that is disposed close to the electrical terminals of the motor.

While only one particular embodiment of the invention has been shown and described herein, it is apparent that changes and modifications may be made thereto without departing from this invention in its broader aspects; and, therefore, the aim in the appended claims is to cover all such changes and modifications as may fall within the true spirit and scope of this invention.

I claim:

1. A method of transmitting information relating to the operation of an electrical device disposed in a borehole, wherein said electrical device is supplied power by means of an electrical power cable which is connected to a power supply located at the earth's surface, comprising the steps of:

detecting information by means of at least one downhole sensor; transmitting said information to said power cable by inductive coupling at a downhole location;

receiving said information at the surface by inductive coupling; and processing said information at the surface wherein said device is electrically powered via a three-phase wire connection, wherein inductive coupling is associated with each of the wires corresponding to a respective phase, and wherein the couplers are disposed in such a manner that the total magnetic flux is zero when the assembly is in a state of electrical equilibrium.

2. A method of transmitting information relating to the operation of an electrical device disposed in a borehole, wherein said electrical device is supplied power by means of an electrical power cable which is connected to a power supply located at the earth's surface, comprising the steps of:

detecting information by means of at least one downhole sensor;

transmitting said information to said power cable by inductive coupling at a downhole location;

receiving said information at the surface by inductive coupling;

processing said information at the surface;

filtering said information between the downhole inductive coupling and the sensor; and filtering said information between the surface inductive coupling and the reception means wherein said device is electrically powered via a three-phase wire connection, wherein inductive coupling is associated with each of the wires corresponding to a respective phase, and wherein the couplers are disposed in such a manner that the total magnetic flux is zero when the assembly is in a state of electrical equilibrium.

3. Apparatus for transmitting information relating to the operation of a device disposed in a borehole comprising:

means for supplying power to said device from the earth's surface;

at least one sensor in the borehole that is suitable for detecting said information;

inductive coupling means for transmitting said information to said power means at a downhole location;

inductive coupling means for receiving said information from said power means at an uphole location; and means for processing said information at the earth's surface wherein said power means comprises three wires each corresponding to a respective power supply phase for said device, the apparatus including an inductive coupler having a ring of magnetically permeable material and a winding, each coupler being associated with a respective phase wire and being disposed in such a manner that the total magnetic flux is zero when the assembly is in a state of electrical equilibrium.

4. Apparatus for transmitting information relating to the operation of a device disposed in a borehole comprising:

- means for supplying power to said device from the earth's surface;
- at least one sensor in the borehole that is suitable for detecting said information;
- inductive coupling means for transmitting said information to said power means at a downhole location;
- inductive coupling means for receiving said information from said power means at an uphole location;
- means for processing said information at the earth's surface;
- filter means disposed between the inductive coupling means and said sensor; and
- filter means disposed between the inductive coupling means and the reception means
- wherein said power means comprises three wires each corresponding to a respective power supply phase for said device, the apparatus including an inductive coupler having a ring of magnetically permeable material and a winding, each coupler being associated with a respective phase wire and being disposed in such a manner that the total magnetic flux is zero when the assembly is in a state of electrical equilibrium.

5. Apparatus according to claim 3 wherein the inductive coupling means includes a ring of magnetically permeable material with said wire connection passing therethrough, and a wire winding whose two ends are connected to said sensor.

6. Apparatus according to claim 4 wherein the inductive coupling means includes a ring of magnetically permeable material with said wire connection passing therethrough, and a wire winding whose two ends are connected to said sensor.

7. Apparatus according to claim 3 wherein said device comprises a pump driven by an electric motor.

8. Apparatus according to claim 3 further comprising a plurality of sensors each suitable for picking up a parameter relating to the operation of said pump.

9. Apparatus according to claim 7 further comprising means on the surface and at the output from said reception means for remote transmission of the information.

* * * * *